United States Patent Office
2,889,008
Patented June 2, 1959

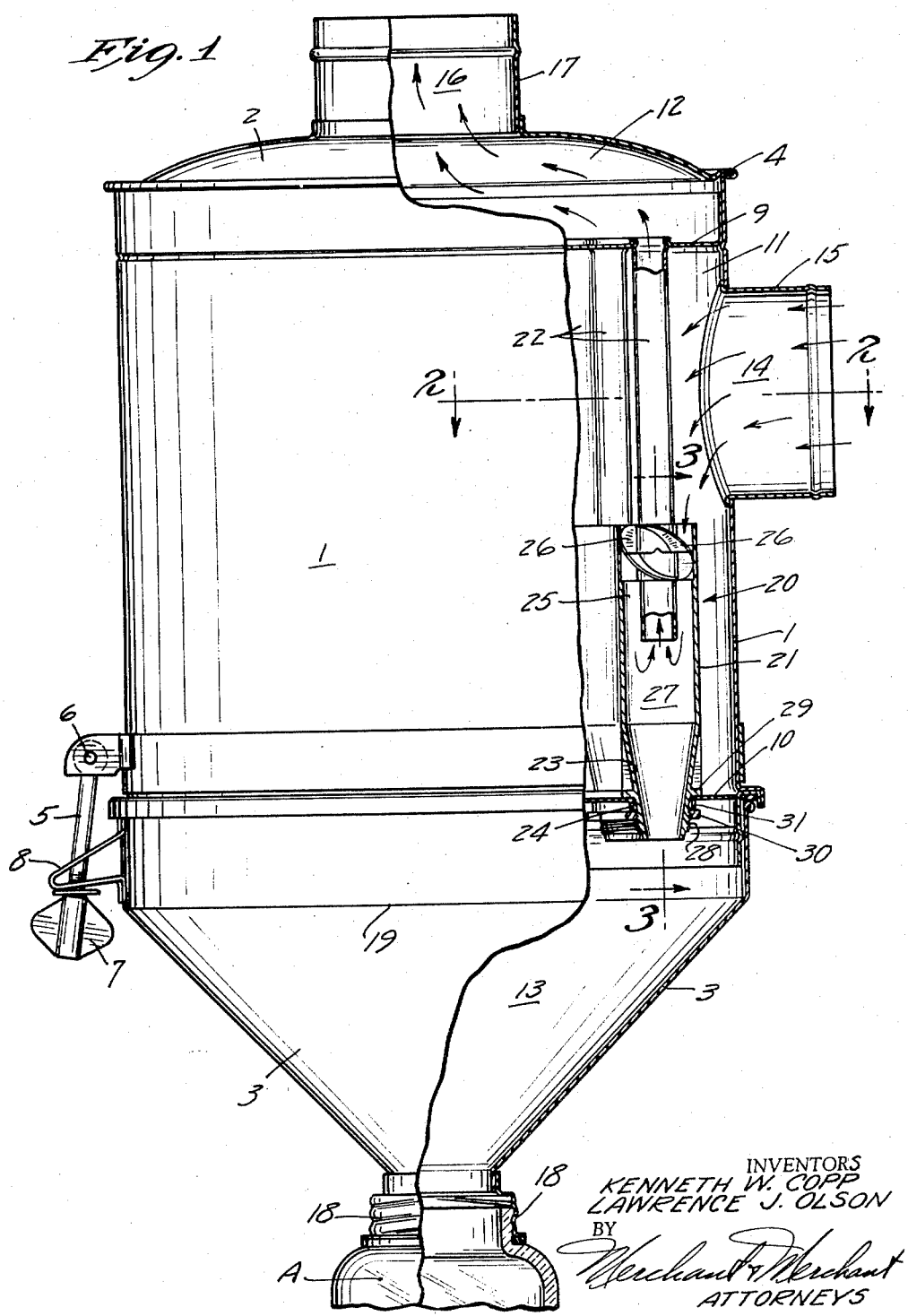

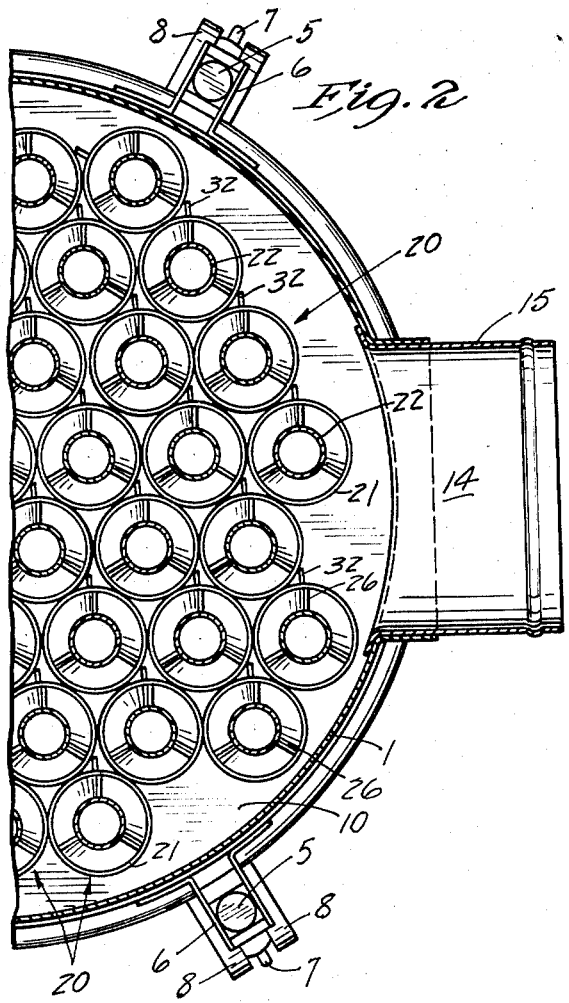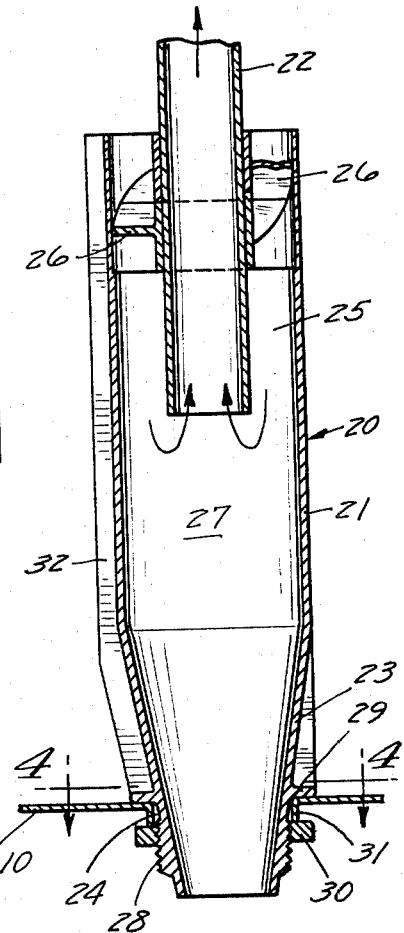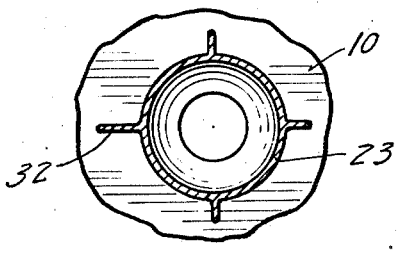

2,889,008
AIR CLEANER

Kenneth W. Copp and Lawrence J. Olson, St. Paul, Minn., assignors to Donaldson Company, Inc., St. Paul, Minn., a corporation of Delaware Application October 8, 1957, Serial No. 688,881

5 Claims. (Cl. 183—81)

Our invention relates to improvements in air cleaners of a variety comprising a plurality of cyclone dust separating units operating in parallel. While air cleaners of the instant invention are suitable for a wide range of uses, they were nevertheless primarily designed for use in the air intake systems of internal combustion engines to remove dust and other foreign substance from the induced air.

As preferably constructed, the cyclone separating units of these cleaners comprise concentric inner and outer tubular elements that are generally cylindrical and are open at opposite ends. In practice, these cyclone separator units are contained within a suitable outer shell or casing structure. This outer shell or casing structure defines a chamber which is herein referred to as a distribution chamber and largely encloses the cyclone separator units and is defined in part by spaced chamber end wall portions between which the cyclone separator units extend and through which they open. In the structure in question the inner tubular elements, which constitute the clean air outlet tubes of said units, are preferably of metal and are preferably mounted fast in an associated chamber end wall portion prior to completion of the assembly of the unit enclosing wall structure. However, the outer tubular elements on the cyclone units, which define cyclone separating chambers in communication with the inner tubes of the cyclone units and discharge separated dust through the associated chamber end wall and are preferably made of suitable plastic, project through their associated chamber end wall and are, in preferred practice, anchored and sealed thereto subsequent to completion of assembly of the wall structure enclosing the confining chamber and are, in preferred practice, mounted on their respectively associated inner tubular elements with freedom for rotation with respect thereto. In practice, the most desirable method of securely anchoring the tubular outer elements of the cyclone separator units in their respectively associated chamber end wall is by screw threading the portion thereof projecting through and beyond the associated chamber end wall and applying screw threaded nuts thereto after assembly of the wall structure defining the distribution chamber which largely encloses said cyclone separating units. In the past, however, attempts to so do have been seriously hampered to the point of impracticability by the tendency of the now inaccessible outer tubular elements of the cyclone separator units to turn during application of the screw threaded nuts thereto; it being noted in this connection that the major portions of said outer tubular elements are inaccessible on one hand and that said elements generally terminate so close to the nuts as to provide no satisfactory gripping surface for the purpose of holding the elements from rotation during application of the nuts.

In view of the above, a specific and highly important objective of the instant invention is the provision of simple but highly effective structural improvements whereby the generally cylindrical outer tubular elements of the cyclone separator units will automatically and positively be retained against rotation during application of screw threaded nuts to the end portions thereof outside of the confining distribution chamber. In the preferred structure illustrated this important objective is accomplished by orientating the plurality of cyclone separating units in closely nested relationship with a substantially uniform center spacing between adjacent units and providing a radial projection on the outer tubular element of each such cyclone unit of a sufficient radial length that the radial measurement of each said outer tubular element taken through its radial projection is greater than one-half of the center line distance between adjacent units, so that the radial projection of each unit will contact the outer element of an adjacent unit to positively stop rotation thereof during screw threaded application of the retaining nuts described above.

The above-mentioned objectives will be enlarged upon and other objectives made apparent from the following specification, claims, and appended drawings.

In the accompanying drawings, like characters indicate like parts throughout the several views.

Referring to the drawings:

Fig. 1 is a view in side elevation with some parts broken away and some parts shown in section of an air cleaner incorporating a preferred embodiment of the invention;

Fig. 2 is a fragmentary transverse sectional view taken on the line 2—2 of Fig. 1;

Fig. 3 is a greatly enlarged fragmentary sectional view taken on the line 3—3 of Fig. 1; and Fig. 4 is a sectional view on the scale of Fig. 3 and taken on the line 4—4 of Fig. 3.

In the drawings hereof, the outer shell or casing structure of the cleaner comprises a generally cylindrical side wall portion 1, an upper end wall portion 2 and a bottom end wall portion 3. The upper shell end wall portion 2 is preferably permanently secured to the side wall portion 1 by suitable means such as indicated at 4, whereas the lower end wall section of the shell is preferably detachably applied to the side wall portion 1 by suitable releasable fastener means such as a plurality of the releasable fasteners of the kind shown at the left in Fig. 1 and each of which comprises a threaded bolt 5 pivotally anchored to the cylindrical wall 1 at 6 and equipped with a wing nut 7 engaging a suitable bracket or the like 8 on the detachable wall portion or element 3. Mounted in and extending transversely across the interior of the side wall portion 1 of the shell in spaced parallel relation to one another and in spaced relation to the shell end wall portions 2 and 3 are partition walls 9 and 10 that divide the interior of the outer shell into an intermediate distributing chamber 11, a clean air chamber 12 and a dust collecting chamber 13. Opening through the shell section 1 into the distributing chamber 11 is an air intake passage 14 defined by coupling sleeve 15 and opening from the clean air chamber 12 is an air outlet passage 16 defined by a coupling sleeve 17. Preferably, but not essentially, the bottom wall section 3 of the outer shell has a bottom portion of generally conical shape to increase the capacity of the dust collecting chamber 13 and is provided with a screw threaded neck 18 to detachably receive a standard glass fruit jar A to further increase the capacity of the dust collecting chamber 13 and to further facilitate removal of collected dust. In some instances, however, the bottom of the shell end wall 13 will be flat and disposed in the plane of the line 19 on Fig. 1.

The cyclone separator units are indicated as an entirety by 20 and each comprise an outer tubular element 21 and an inner tubular element 22. The outer tubular elements 21 are cylindrical throughout the major portions of their lengths and the tubular elements 22 are cylindrical substantially throughout their entire lengths. The generally cylindrical outer tubular elements 21 have generally conical converging lower end portions 23 that project through suitable receiving apertures 24 in the partition wall 10. The inner tubular elements 22 of the cyclone separator units 20 extend from the longitudinally intermediate portions of their respective cooperating outer tubular elements 21 axially of the latter and project through suitable apertures in the partition wall 9 that are coaxially aligned with corresponding apertures 24 in the baffle wall 10. In preferred practice, the tubular elements 22 will be metallic and will be securely anchored and sealed in the baffle wall 9. This may be accomplished by suitable forming operations as shown, or by soldering, welding, or a combination of the former and one of the latter for example. These operations will usually be completed before assembly of the partition wall 9 and the baffle wall 10 will usually be secured in position by solder or the like. The inner tubular elements 22, which function as the clean air outlet tubes of the separator units 20, have outside diameters considerably less than the inside diameters of the outer elements 21 and define therewith annular air inlet passages 25 to the individual cyclone separators 20 and in which are located spiral vanes 26. The outer tubular elements 21 define the cyclone separating chambers 27 of the units 20 and which chambers 27 have converging lower end portions which open into the common dust collecting chamber 13.

In preferred practice the spiral vanes 26 and the outer tubular elements 21 are of plastic material, such as nylon; the vanes 26 being preferably cemented to the tubular elements 22 but being merely snugly press fit into the plastic outer tubular elements 21. Since the plastic material provides relatively smooth and slippery surfaces it will be apparent that the tubular elements 21 will be readily rotatable on the vanes 26 and with respect thereto and the relatively fixed inner tubular elements 22.

The plastic tubular elements 21 are provided adjacent their lower ends and near the bottoms of their converging end portions 23 with external screw threads 28 and immediately above said threads 28 with integrally formed annular stop flanges 29. The stop flanges 29 are seated on the inside of the partition wall 10 and the threads 28 project beyond or outwardly of said wall 10 and are provided with internally threaded nuts 30 that engage downturned annular flanges 31 defining the receiving apertures 24 in the baffle wall 10.

In practice, the baffle wall 10 is preferably installed after assembly of the partition wall 9 together with all of the completely assembled cyclone separator units 20. Hence, when the nuts 30 are finally applied to positively anchor the tubular elements 21 in the partition wall 10 the major portions of the tubular elements 21 are inaccessibly enclosed within the distribution chamber 11 so it is practically impossible to grasp the same by tool, hand or otherwise to hold the same against rotation during application of the screw threaded nuts 30. In fact, the tendency of the tubular elements 21 to rotate with the nuts 30 is, in preferred practice, aggravated by the fact that the metal nuts 30 have undersized threads to reduce the chance of accidental removal under severe vibration and therefore produce a heavy rotational drag during application.

As indicated previously, rotation of the tubular elements 21 with the threaded nuts 30 upon application of the latter is eliminated by providing said elements 21 with radial projections 32 which are preferably, and as shown, in the nature of longitudinally elongated radially projecting ribs projecting from and integrally formed with the tubular elements 21. As shown particularly in Fig. 2, the cyclone separator units are preferably arranged in a closely nested pattern permitting a maximum number thereof in a given space. The center distances between adjacent cyclone separator units 20 is constant throughout the pattern and preferably the cylindrical portions of the outer tubular elements 21 thereof are substantially in contact with one another. However, regardless of the exact spacing between the adjacent tubular elements 21, the radial measurement of each tubular element 21 taken through its said rib 32 is greater than the distance between the center of one such tubular element and the outer cylindrical surface of an adjacent outer tubular element, so that the projecting ribs 32 will positively engage adjacent tubular elements 21 to stop rotation during application of the threaded nuts 30.

It will be noted that the threads 28 are located near the minimum diameter end portion of the converging parts 23 of the tubular elements 21 where they can and do have a maximum diameter very materially less than the maximum diameter of the cylindrical upper portions of the elements 21, so that the overall or maximum diameters of the nuts 30 can be and are less than the maximum diameters of the elements 21.

Our invention has been thoroughly tested and found to be completely satisfactory for the accomplishment of the above objects, and while we have disclosed one commercial form of the invention, it will be understood that the same in capable of modification without departure from the spirit and scope of the invention as defined in the claims.

What we claim is:

1. In an air cleaner, wall structure defining a distribution chamber having a tubular side wall portion and spaced generally parallel end wall portions, the side wall portion defining an air inlet passage for introduction of dust-laden air to the distributing chamber, a plurality of cyclone dust separating units located largely within the distributing chamber and disposed in generally parallel relation to one another and the longitudinal axis of said chamber and extending between and connecting the said end wall portions of the chamber, each said cyclone separating unit comprising inner and outer tubular elements each open at its opposite ends, each said outer tubular element being generally cylindrical throughout the major portion of its length and having a converging outer end portion projecting through and snugly received in a receiving aperture in the adjacent end wall portion of the distributing chamber and having an open inner end disposed intermediate the end wall portions of said chamber, the inner end of each of said tubular elements projecting from the intermediate portion of a cooperating outer tubular element through and being anchored in the other of the end wall portions of the distributing chamber and defining with its cooperating outer tubular element an annular passage therebetween to a cylone separating chamber defined by said associated outer tubular element, vane means within each said annular passage to impart a whirling motion to air entering the associated cyclone separating chamber, the cylindrical portions of said outer tubular elements being closely nested and substantially in contact with one another and each being provided with a longitudinally extending radial rib, the radial measurement of each said outer tubular element taken through and including its said rib being greater than the distance between the center of one such outer tubular element and the outer cylindrical surface of an adjacent outer tubular element, the converging outer end portion of each said outer tubular element being provided outwardly of the associated chamber end wall portion with external screw threads of materially reduced diameter with respect to the major cylindrical portions of said outer tubular elements, and an anchoring nut applied to each said threaded portion on the outside of the associated end wall portion and having a maximum diameter that is less than one-half the center line distance between adjacent outer tubular elements, said radial ribs contacting adjacent outer tubular elements of the cyclone separators to positively stop rotation thereof upon tightening or loosening of the anchoring nuts.

2. In an air cleaner, a tubular outer shell having spaced end wall portions, transverse partition walls spaced from one another and each from an opposite end wall portion and dividing the interior of the outer shell into a distributing chamber between said partition walls and a dust chamber between one of said partition walls and an adjacent end wall portion, and a clean air chamber between the other partition wall and the other said end wall portion, an air intake leading to the distributing chamber, an air outlet leading from the clean air chamber, and a plurality of cyclone dust separating units located largely within the distributing chamber and disposed in generally parallel relation to one another and the longitudinal axis of the distributing chamber, each said cyclone separating unit comprising concentric inner and outer tubular elements each open at its opposite ends, each said outer tubular element having a converging outer end portion projecting through and snugly received in a receiving aperture in the partition wall adjacent the dust collecting chamber and having an open inner end disposed intermediate said partition walls, the inner of each said tubular element projecting from the intermediate portion of a cooperating outer tubular element through and being anchored in the other of said partition walls and defining with its cooperating outer tubular element an annular passage therebetween to a cyclone separating chamber defined by said cooperating outer tubular element, air whirling means within each said annular passage, said outer tubular elements being in closely adjacent parallel relationship within the distribution chamber and each being provided with a radial projection, the radial measurement of each said outer tubular element taken through and including said radial projection being greater than the distance between the center of one such outer tubular element and the outer cylindrical surface of an adjacent outer tubular element, the converging outer end portion of each said outer tubular element being provided outwardly of the associated partition wall with external screw threads and an anchoring nut applied thereto and located within the dust collecting chamber, said radial projections contacting adjacent outer tubular elements of the cyclone separators to positively stop rotation of said outer tubular elements upon tightening or loosening of said anchoring nuts.

3. In an air cleaner, a tubular outer shell having spaced end wall portions, transverse partition walls spaced from one another and each from an opposite end wall portion and dividing the interior of the outer shell into a distributing chamber between said partition walls and a dust chamber between one of said partition walls and an adjacent end wall portion, and a clean air chamber between the other partition wall and the other said end wall portion, an air intake leading to the distributing chamber, an air outlet leading from the clean air chamber, and a plurality of cyclone dust separating units located largely within the distributing chamber and disposed in generally parallel relation to one another and the longitudinal axis of the distributing chamber, each said cyclone separating unit comprising concentric inner and outer tubular elements each open at its opposite ends, each said outer tubular element having a converging outer end portion projecting through and snugly received in a receiving aperture in the partition wall adjacent the dust collecting chamber and having an open inner end disposed intermediate said partition walls, the inner of each said tubular element projecting from the intermediate portion of a cooperating outer tubular element through and being anchored in the other of said partition walls and defining with its cooperating outer tubular element an annular passage therebetween to a cyclone separating chamber defined by said cooperating outer tubular element, spiral vane means within each said annular passage to impart a whirling motion to air entering the associated cyclone separating chamber, the major portions of said outer tubular elements within the distribution chamber being cylindrical and the cylindrical portions of said outer tubular elements being closely nested and substantially in contact with one another and each being provided with a longitudinally extended radial rib, the radial measurement of each said outer tubular element taken through and including its said rib being greater than the distance between the center of one such outer tubular element and the outer cylindrical surface of an adjacent outer tubular element, the converging outer end portion of each said outer tubular element being provided outwardly of the associated partition wall with external screw threads of materially reduced diameter with respect to the major cylindrical portion of that tubular element, and an anchoring nut applied to each said threaded portion and having a maximum radial measurement that is less than one-half the center line distance between adjacent outer tubular elements, said radial ribs contacting adjacent outer tubular elements of the cyclone separators to positively stop rotation thereof upon tightening or loosening of the anchoring nuts.

4. The structure defined in claim 1 wherein the outer tubular elements of the cyclone separators are rotatable with respect to the inner tubular elements thereof before the said anchoring nuts are tightened.

5. The structure defined in claim 2 in which at least a major part of the end wall portion of the outer shell adjacent the dust collecting chamber is displaceable to allow access to the said anchoring nuts.

References Cited in the file of this patent

UNITED STATES PATENTS

| 2,082,242 | Bowen | June 1, 1937 |
| 2,086,882 | Seitz | July 13, 1937 |
| 2,765,918 | Fontein et al. | Oct. 9, 1956 |

FOREIGN PATENTS

| 643,656 | Germany | Apr. 14, 1937 |
| 66,829 | Denmark | May 18, 1948 |
| 637,962 | Great Britain | May 31, 1950 |